United States Patent [19]

Nakamura et al.

[11] Patent Number: 5,652,662
[45] Date of Patent: Jul. 29, 1997

[54] COMMUNICATIONS APPARATUS WHEREIN TRANSMISSION OF CIPHERED DATA IS DEPENDENT UPON AVAILABLE MEMORY

[75] Inventors: Mitsuhiro Nakamura; Kohichi Shibata, both of Osaka, Japan

[73] Assignee: Mita Industrial Co., Ltd., Osaka, Japan

[21] Appl. No.: 400,820

[22] Filed: Mar. 8, 1995

[30] Foreign Application Priority Data

Mar. 14, 1994 [JP] Japan .................... 6-042593

[51] Int. Cl.[6] ................................ H04N 1/44
[52] U.S. Cl. ................ 358/405; 358/404; 380/18
[58] Field of Search .................. 358/404–406, 358/440, 442, 468, 400; 380/18, 49–50; H04N 1/44

[56] References Cited

U.S. PATENT DOCUMENTS

| | | |
|---|---|---|
| 5,163,088 | 11/1992 | LoCascio .................. 380/18 |
| 5,233,653 | 8/1993 | Katsurabayashi .................. 380/18 |
| 5,331,424 | 7/1994 | Matsui et al. .................. 358/404 |
| 5,394,406 | 2/1995 | Ono et al. .................. 358/400 |

*Primary Examiner*—Kim Vu
*Attorney, Agent, or Firm*—Beveridge, DeGrandi, Weilacher & Young, LLP

[57] ABSTRACT

In transmitting enciphered data, to enable an ECM communication, whether a cipher communication is performed or not can be decided according to an available memory capacity. To perform the cipher communication, whether the available capacity of a RAM 4 is sufficient for one frame or not is determined. When the available capacity $X_0$ of the RAM 4 is larger than a memory capacity $X$ necessary for the cipher communication according to an ECM communications method, the cipher communication is executed. When the available capacity $X_0$ of the RAM 4 is smaller than the memory capacity $X$ necessary for the cipher communication according to the ECM communications method, it is determined that the cipher communication is impossible, and the communications mode is changed to the normal transmission according to the G3 communication.

8 Claims, 4 Drawing Sheets

PRIOR ART

COMMUNICATIONS APPARATUS WHEREIN TRANSMISSION OF CIPHERED DATA IS DEPENDENT UPON AVAILABLE MEMORY

BACKGROUND OF THE INVENTION

1. Field of the Invention

The present invention relates to a communications apparatus which performs a cipher communication, and more particularly, to a communications apparatus such as a facsimile apparatus having a cipher communication function.

2. Description of the Prior Art

In the facsimile communication, various special communications can be performed as options in communication between facsimile apparatuses of the same manufacturer. The cipher communication is one of such special communications.

Referring to FIG. 4, there is shown the procedure of a typical cipher communication. A signal processing procedure on the transmitting side is shown at 91 to 93. The image data is encoded at 91. Then, to make the communication secret, the encoded image data is enciphered by using a key at 92 and transmitted at 93. A signal processing procedure on the receiving side is shown at 94 to 96. The cipher data received at 94 is deciphered at 95. The decipherment is to clear the cipher by using the same key as that used on the transmitting side. The deciphered data is encoded at 96 and returned to the original image data. The key is a kind of data.

In the image communication with a facsimile apparatus, there is always a possibility that a data error occurs according to the condition of the telephone line. If the data on the transmitting side is not correctly sent to the receiving side due to the data error, from the time of occurrence of the data error, a data error occurs on the receiving side in deciphering/decoding the data, so that the data sent from the transmitting side cannot be returned to the original state. As a result, a correct image cannot be obtained.

For example, a response signal transmitted from the receiving side every time the transmission of data for one page or a part of a page is completed serves as a response signal representative of a re-transmission request (PPR) when the data are not correctly received on the receiving side. In this case, of the data for one page or a part of a page stored in the memory, the transmitting side re-transmits the data requested by the receiving side.

Referring to FIG. 5, there is shown an example of a data of an HDLC format used for an ECM communication. In data of the HDLC format, one frame includes encoded signals of a flag F, an address A, a control C, an image data FIF and a check CRC arranged in this order. Each frame is of a predetermined size.

On the receiving side, when a signal such as a procedure completion signal (PPS-EOP), a message completion signal (PPS-EOM), a multi-page signal (PPS-MPS) and a partial page signal (PPS-NULL) (these signals will be referred to as PPS-Q en bloc) is received from the transmitting side, if there is an error in a received frame, the frame is specified, and a partial page request signal (PPR) is transmitted to request the re-transmission of the data.

On the transmitting side, the transmitted data are stored in the memory in case of errors, and the frame including an error is re-transmitted in response to the request of the receiving side. The maximum number of frames transmitted in response to the partial page request signal is 256, and the maximum bytes of the data transmitted in one frame is 256. Therefore, on the transmitting side, a memory of at least 256 frames×256 bytes=64 kilobytes is necessary for the ECM communication.

However, according to the ECM communication, since it is necessary to store the data in the memory of the transmitting side as described above, the ECM communication cannot be performed when the cipher communication is performed and when it is necessary to transmit a large amount of data.

Specifically, the cipher communication is specified in the beginning of transmission, and the control unit performs an operation for the cipher communication. In executing the cipher communication function, a large memory capacity is necessary compared to the normal communication. For this reason, when the cipher communication is performed, it may be impossible to secure the memory capacity necessary for the ECM communication.

If the memory capacity necessary for the ECM communication cannot be secured when the cipher communication is performed, a data error may occur on the receiving side, so that when the re-transmission of the data is requested, the transmitting side cannot re-transmit the data. When the re-transmission cannot be performed, the ECM communication is not effected at that point of time, so that it is impossible to surely transmit the data to the receiving side.

SUMMARY OF THE INVENTION

An object of the present invention is to provide a communications apparatus with which whether the cipher communication is performed or not can be decided according to the available memory capacity in order to enable the ECM communication when enciphered data are transmitted.

To achieve the above-mentioned object, according to the present invention, in a communications apparatus having a function to perform a cipher communication, a control unit is provided for, in performing a cipher communication according to the ECM communications method, recognizing an available memory capacity and deciding whether the cipher communication is performed or not according to the available memory capacity. The control unit may be provided with a function to automatically change the communications mode from the cipher communication to the normal communication when it is determined that the memory capacity necessary for the ECM communication cannot be secured in performing a cipher communication according to the ECM communications method.

According to the above-described features, in transmitting data through the cipher communication, the available memory capacity is recognized by the control unit and the cipher communication is not performed when a minimum available memory capacity necessary for the ECM communication cannot be secured, so that the execution of the ECM communication is not prevented. As a result, data are surely transmitted from the transmitting side to the receiving side, and the occurrence of errors in the deciphering/decoding on the receiving side due to data errors caused according to the telephone line condition is avoided. In the arrangement where the communications mode is automatically changed from the cipher communication to the normal communication when the necessary available memory capacity cannot be secured, since the communications mode can be automatically changed, for example, to the normal G3 communication, the rapidity and convenience of the communication are improved.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
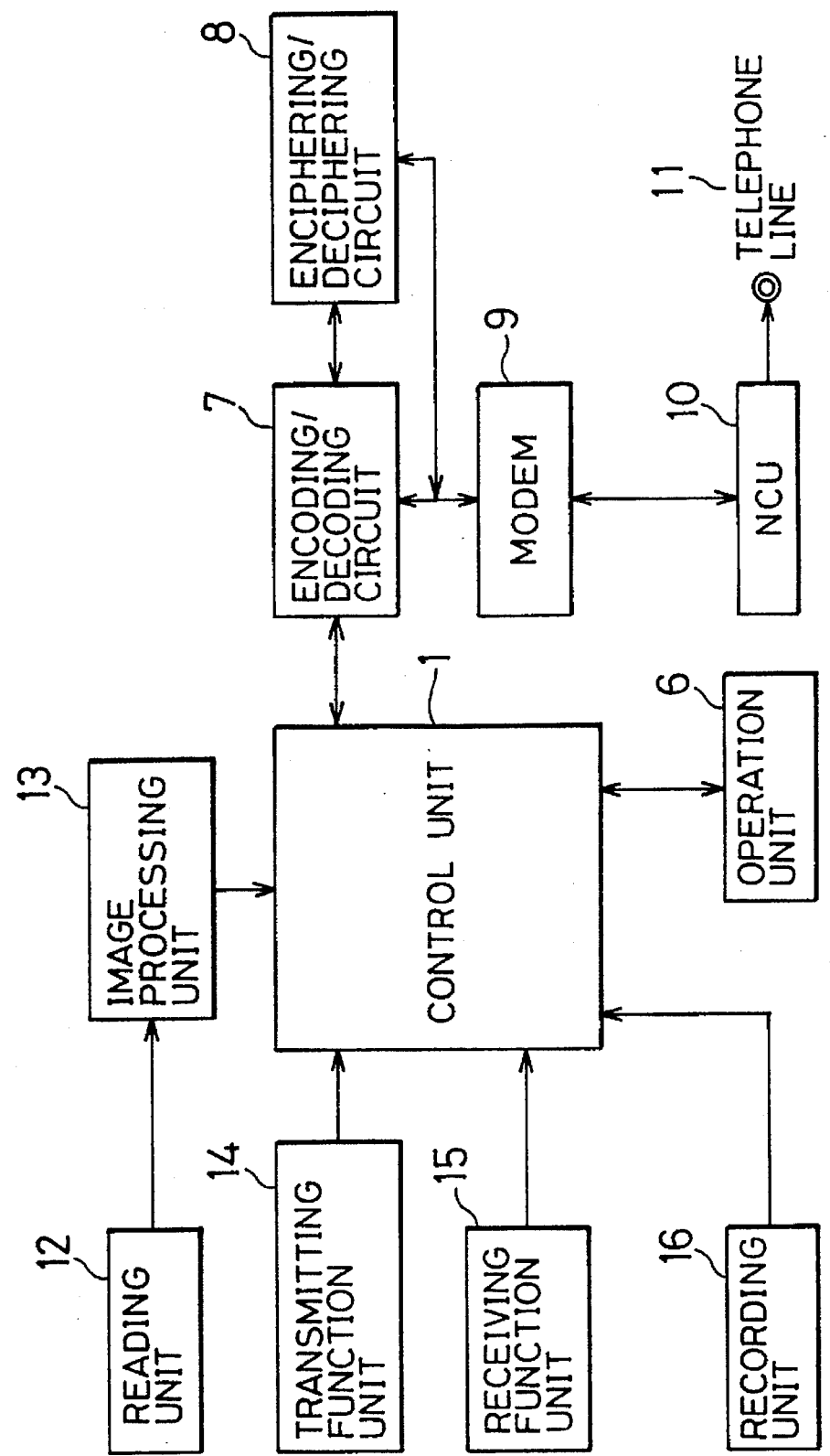
FIG. 1 is a schematic block diagram showing the arrangement of a facsimile apparatus according to an embodiment of the present invention.
Figure 2:
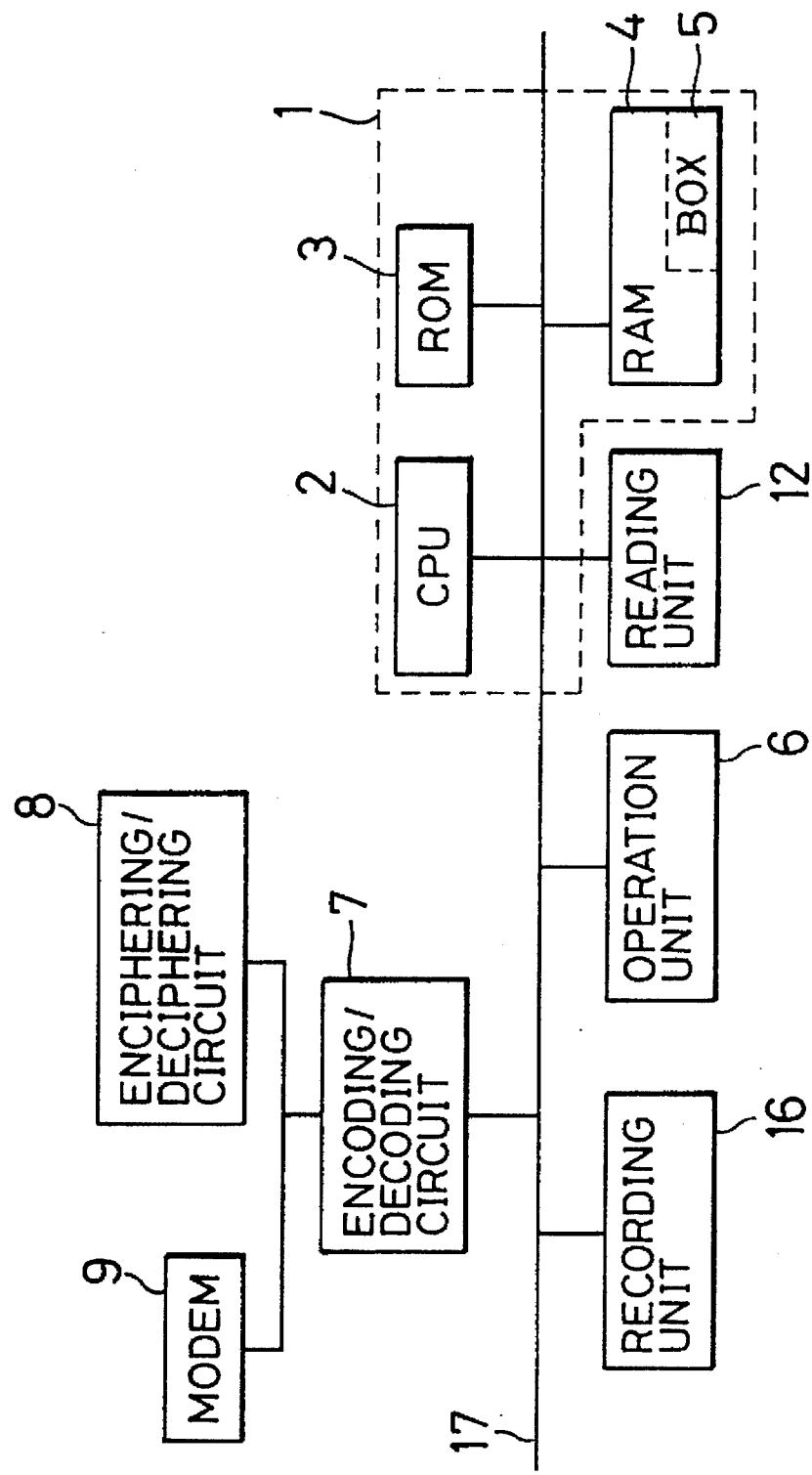
FIG. 2 is a view specifically explaining a control unit of the facsimile apparatus of FIG. 1 and showing the connection of the control unit with other elements.

An embodiment of the present invention will be described with reference to the drawings. Referring to FIG. 1, there is shown a block diagram of the general structure of a facsimile apparatus embodying the present invention. Reference numeral 1 represents a control unit comprising a microcomputer which controls the entire apparatus. As shown in FIG. 2, the control unit 1 includes a central processing unit (CPU) 2, a read only memory (ROM) 3 for storing a program and a random access memory (RAM) 4. The RAM 4 has a confidential box 5 as one configuration of the memory area.

Returning to FIG. 1, reference numeral 6 represents an operation unit. Reference numeral 7 represents an encoding/decoding circuit. Reference numeral 8 represents an enciphering/deciphering circuit. Reference numeral 9 represents a modem. Reference numeral 10 represents a network control unit (NCU). Reference numeral 11 represents a telephone line. Reference numeral 12 represents a reading unit which reads out an original. Reference numeral 13 represents an image processing unit which performs processing (e.g. shading correction) of the read-out image data. Reference numeral 14 represents a transmitting function unit. Reference numeral 15 represents a receiving function unit. Reference numeral 16 represents a recording unit having a printer unit. The above-mentioned elements and the CPU 2 are connected through a data bus 17 as shown in FIG. 2. The enciphering/deciphering circuit 8 performs encipherment when the facsimile apparatus operates as a transmitter and performs decipherment when it operates as a receiver.

Figure 3:
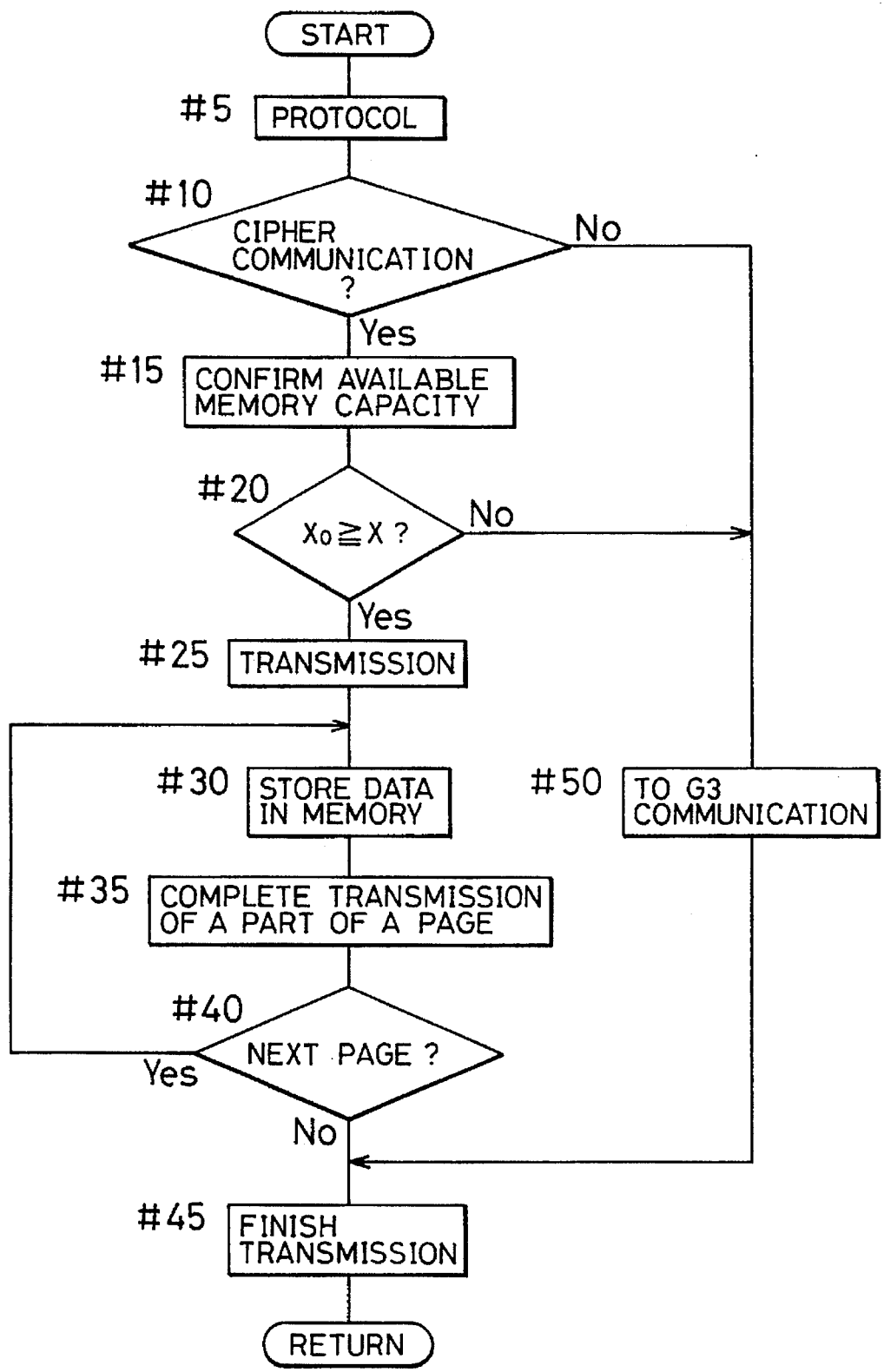
FIG. 3 is the flowchart of an operation relating to transmission through the cipher communication.
Figure 4:
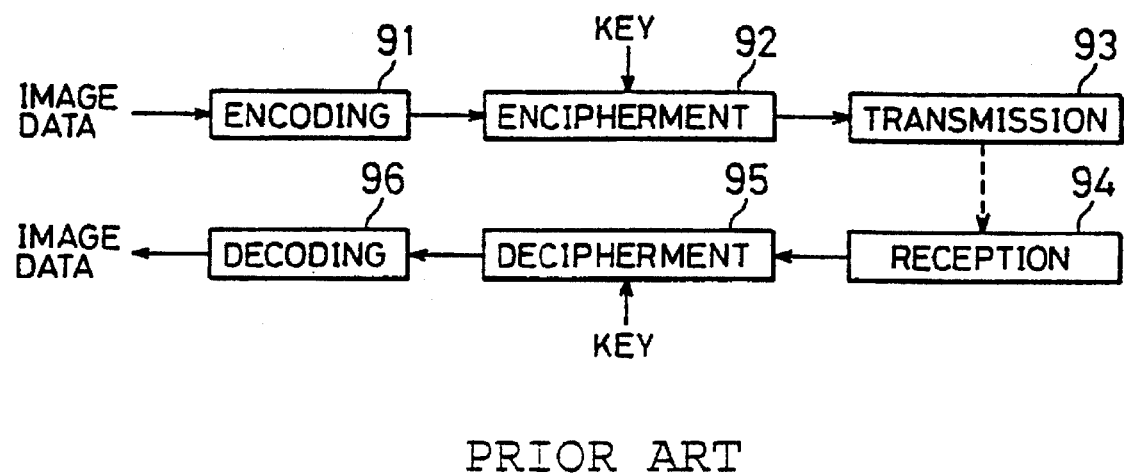
FIG. 4 is a schematic view showing general operation procedures of the transmitting and receiving sides in the cipher communication.
Figure 5:
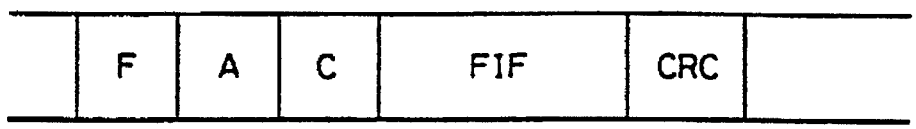
FIG. 5 is a schematic view showing an example of a data of the HDLC format used for the ECM communication.

Subsequently, an operation performed by the control unit 1 when the facsimile apparatus operates as a transmitter in the cipher communication will be described. Referring to FIG. 3, there is shown an example of the operation by the control unit 1. When a call is placed from the transmitting side, the program shown in FIG. 3 is activated. First, at step #5, the protocol is executed, and at step #10, whether the communication to be performed is a cipher communication or not is determined. This determination is made based on a bit of a signal for the cipher communication received in the protocol.

When the communication to be performed is not a cipher communication, the process proceeds to step #50 to perform a normal transmission processing, for example, according to the G3 communication. When the communication to be performed is a cipher communication, at step #15, whether the available capacity of the RAM 4 serving as the memory is sufficient for one frame or not is confirmed. When the available memory capacity $X_0$ of the RAM 4 is larger than the memory capacity X necessary for the cipher communication according to the ECM communications method at step #20, the cipher communication is performed at step #25, and the transmitted data are stored in the RAM 4 while they are still in the form of cipher at step #30.

When it is determined at step #10 that the communication to be performed is a cipher communication, the process proceeds to step #15 to confirm the available memory capacity. When the available memory capacity $X_0$ is smaller than the memory capacity X necessary for the ECM communication, it is determined that the cipher communication is impossible, and the process proceeds to step #50 to change the communications mode to the normal transmission according to the G3 communication. When the available memory capacity $X_0$ is larger than the memory capacity necessary for the ECM communication, transmission of the cipher communication is performed at step #25. Transmission for a part of a page is completed at step #35, and when it is sensed at step #40 that all the data have been transmitted at this point of time, the transmission is finished at step #45. Then, the process returns. However, when it is recognized at step #40 that there is a page that follows, the process returns to step #30 to store data of the page in the memory.

In this embodiment, when the available memory capacity $X_0$ is smaller than the memory capacity X necessary for the cipher communication according to the ECM communication and it is determined that the cipher communication is impossible, the control unit 1 operates to automatically change the communications mode to the normal transmission according to the G3 communication. In this case, a message may be provided such that "CIPHER COMMUNICATION IS IMPOSSIBLE. MODE IS CHANGED TO NORMAL COMMUNICATION".

Instead of automatically changing the mode, a message such that "CIPHER COMMUNICATION IS IMPOSSIBLE. PLEASE CHANGE THE MODE TO NORMAL COMMUNICATION." may be provided so that the user can change the mode from the cipher communication to the normal G3 communication.

Thus, according to the communications apparatus of the present invention, transmission according to the cipher communication is performed only when a minimum available memory capacity necessary for the ECM communication can be secured, so that when a data error occurs in the cipher communication, the error can be corrected.

Obviously, many modifications and variations of the present invention are possible in light of the above teachings. It is therefore to be understood that within the scope of the appended claims, the invention may be practiced other than as specifically described.

What is claimed is:

1. A communications apparatus for performing cipher transmissions according to an ECM communications method, wherein a control unit is provided for recognizing an available memory capacity and automatically changing a communication mode from a cipher transmission to a normal transmission when the available memory capacity necessary to perform the cipher transmission according to the ECM communications method is unavailable.

2. A communications apparatus according to claim 1, wherein said communications apparatus is a facsimile apparatus.

3. A communications apparatus for performing cipher communication, comprising:

a memory for storing data to be transmitted until it is confirmed that the data is surely received; and controlling means for controlling transmission so that
the data to be transmitted is enciphered, stored in the memory and transmitted to a predetermined destination when an available memory capacity of the memory is larger than a predetermined amount, and
the data to be transmitted is transmitted to the predetermined destination without being enciphered when the available memory capacity of the memory is smaller than the predetermined amount.

4. A communications apparatus for performing an ECM communication according to a ciphered transmission mode and a G3 transmission mode, comprising:

an enciphering circuit for enciphering data to be transmitted;

a memory for storing data to be transmitted; and controlling means for controlling transmission so that
an ECM communication is performed according to the ciphered transmission mode, in which data enciphered by the enciphering circuit is stored in the memory and transmitted, when an available memory capacity of the memory is larger than an amount needed to perform the ECM communication according to the ciphered transmission mode, and
an ECM communication is performed according to the G3 transmission mode, without the data to be transmitted being enciphered by the enciphering circuit, when the available memory capacity of the memory is smaller than the amount needed to perform the ECM communication according to the ciphered transmission mode.

5. A communications apparatus capable of transmitting enciphered data, comprising:

a memory unit; and a control unit for changing a communication from a ciphered transmission to a normal transmission when sufficient memory in the memory unit is unavailable to perform said ciphered transmission.

6. A communication apparatus as recited in claim 5, wherein:

said communication is an ECM communication.

7. A communication apparatus as recited in claim 5, wherein said communications apparatus is a facsimile apparatus.

8. A communications apparatus capable of enciphering data, as recited in claim 5, further comprising:

means for transmitting ciphered communications; and means for transmitting normal communications.

* * * * *